(12) United States Patent
Guo et al.

(10) Patent No.: US 8,669,005 B2
(45) Date of Patent: Mar. 11, 2014

(54) CONNECTION STRUCTURE FOR CONNECTING A TAB OF A BATTERY CELL WITH A COVER BOARD

(75) Inventors: Chuntai Guo, Guangdong (CN); Fang Liu, Guangdong (CN); Liren Zhu, Guangdong (CN)

(73) Assignee: Bak Electronic (Shenzhen) Co., Ltd., Shenzhen (CN)

( * ) Notice: Subject to any disclaimer, the term of this patent is extended or adjusted under 35 U.S.C. 154(b) by 463 days.

(21) Appl. No.: 13/003,071

(22) PCT Filed: Sep. 23, 2008

(86) PCT No.: PCT/CN2008/072476
§ 371 (c)(1),
(2), (4) Date: Mar. 17, 2011

(87) PCT Pub. No.: WO2010/003296
PCT Pub. Date: Jan. 14, 2010

(65) Prior Publication Data
US 2011/0159357 A1 Jun. 30, 2011

(30) Foreign Application Priority Data
Jul. 10, 2008 (CN) .......................... 2008 1 0068496

(51) Int. Cl.
*H01M 2/02* (2006.01)
(52) U.S. Cl.
USPC ........................................................ 429/179
(58) Field of Classification Search
None
See application file for complete search history.

(56) References Cited

U.S. PATENT DOCUMENTS

| 6,168,879 | B1* | 1/2001 | Kim ................................. 429/61 |
| 6,319,628 | B1* | 11/2001 | Zama ............................... 429/65 |
| 6,372,380 | B1 | 4/2002 | Kitami et al. |
| 6,926,992 | B2 | 8/2005 | Isozaki et al. |
| 2007/0224491 | A1 | 9/2007 | Woo |
| 2009/0148766 | A1* | 6/2009 | Shen et al. .................... 429/164 |

FOREIGN PATENT DOCUMENTS

| CN | 1271971 A | 11/2000 |
| CN | 101047265 A | 10/2007 |
| CN | 101262050 A | 9/2008 |
| JP | 2004281116 A | 10/2004 |

OTHER PUBLICATIONS

ISR for PCT/CN2008/072476 dated Apr. 16, 2009.

\* cited by examiner

*Primary Examiner* — Patrick Ryan
*Assistant Examiner* — Jose Colucci Rios
(74) *Attorney, Agent, or Firm* — Lowe Hauptman & Ham, LLP

(57) ABSTRACT

A connection structure for connecting a tab of a cell with a cover board comprising a tab and a cover board is provided. An insulating spacer and an elastic conductive ring are provided at an end of the cell. The tab passes through an orifice of the insulting spacer and then is electrically connected with the elastic conductive ring which is electrically connected with the cover board. An elastic pressing disc may be further provided on the elastic conductive ring. The elastic conductive ring is electrically connected with the cover board via the elastic pressing disc. A staple may be further provided on the elastic pressing disc and the elastic conductive ring. The staple has a slot on one end for matching with an elastic hook provided on the insulating spacer.

10 Claims, 3 Drawing Sheets and claims priority from, Chinese Application Number 200810068496.0 filed Jul. 10, 2008.

CONNECTION STRUCTURE FOR CONNECTING A TAB OF A BATTERY CELL WITH A COVER BOARD

RELATED APPLICATIONS

The present application is National Phase of PCT/CN2008/072476 filed Sep. 23, 2008, and claims priority from, Chinese Application Number 200810068496.0 filed Jul. 10, 2008.

TECHNICAL FIELD

The present invention relates to a battery structure, in particular, to a connection structure for connecting a tab of a battery cell with a cover board.

BACKGROUND

A lithium-ion secondary battery is composed of a negative polar plate, a positive polar plate, an electrolytic solution and a membrane between the positive and negative polar plates for preventing a short circuit. The positive polar plate and the negative polar plate are formed as a thin plate or a foil. The electrical polar plates and the membrane therebetween are then stacked sequentially or wrapped helically so as to form a battery cell, which is embedded into a battery container made of stainless steel, nickel plated iron, aluminum metal or a stacked flexible package thin film. After electrolytic solution is injected into the battery container, the battery container is sealed and the battery is formed. The electrical conduction between the cell and external components is achieved by a connection between tabs connected to the polar plates and a pole or a cover board.

In prior art, a plurality of tabs on the polar plates are connected with each other by an ultrasonic welding or a metal melting welding, and then conductively connected to one end of a metallic conductor, the other end of which is conductively connected to upper and lower cover boards of a battery shell, so that the tabs of the polar plates are connected with the pole of the battery shell conductively. However, this operation is complex in the battery manufacture. In particular, a splash of metallic particles may occur during the fusion welding, which impacts the safety and performance of the cell seriously. The participation welding may also pull the connection between the tabs and the polar plates due to mechanical vibration and inconvenient operation and influence the battery performance.

SUMMARY

The present invention aims at addressing the above-mentioned issues and providing a connection structure for connecting a tab of a cell with a cover board, which is easy to be assembled without welding. Meanwhile, a large contact area between the tabs and the conductor is maintained.

The purpose of the present invention is achieved by the following technical solution.

The connection structure for connecting a tab of a cell with a cover board comprises a tab and a cover board.

The connection structure also comprises an insulating spacer and an elastic conductive ring arranged on the insulating spacer. The tab is electrically connected with the elastic conductive ring after passing through orifices of the insulting spacer. The elastic conductive ring is electrically connected with the cover board.

In the connection structure, the electrical connection between the elastic conductive ring and the cover board may be a contact electrical connection.

An elastic pressing disc may also be provided in the connection structure for pressing the elastic conductive ring tightly. In this case, the elastic conductive ring is electrically connected with the cover board via the elastic pressing disc.

Installation steps may be arranged on the insulating spacer so that peripheries of the elastic conductive ring and the elastic pressing disc are clamped in the installation steps.

The installation steps may be a plurality of installation clips arranged on the internal wall of the insulating spacer.

Alternatively, the installation steps may be an annular installation groove arranged on an inner wall of the insulating spacer.

A staple may also be provided, with a pressure surface on one end for pressing the elastic pressing disc on the elastic conductive ring and a slot on the other end for matching with an elastic hook provided on the insulating spacer.

A stretch conductor may be arranged between the cover board and the staple. In this case, the elastic pressing disc is electrically connected with the cover board via the staple and the stretch conductor.

According to the present application, a plurality tabs may be provided.

The following advantageous may be produced by the present invention compared with the prior art.

1. An elastic conductive ring is provided, which connects the tabs to the cover board electrically by a simple assembly. The welding is unnecessary so that the performance and safety of the battery will not be impacted by the splash of metallic particles during welding. The assembly efficiency is also improved. An insulating spacer is provided, which effectively prevents a short circuit due to the contact between the connected metallic conductor and the shell or the polar plates.

2. An elastic pressing disc is provided, which ensures the reliable connection between the tabs and the elastic conductive ring, enlarges the contact area between the tabs and the elastic conductive ring, and overcomes the problem of over-large internal resistance of battery due to the poor welding in the prior welding art.

3. A staple is provided, which matches with the elastic hook provided on the insulating spacer to resist the deformation of the elastic pressing disc, thus enhancing the connection and avoiding the poor contact due to the deformation of the elastic pressing disc.

BRIEF DESCRIPTION OF THE DRAWINGS

FIG. 2 is an explosive view of a particular embodiment.

DETAILED DESCRIPTION

Figure 1:
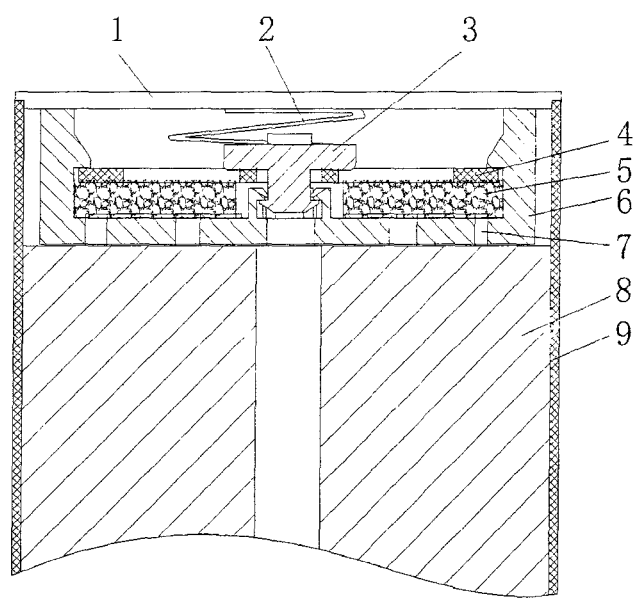
FIG. 1 is a structural view of a particular embodiment.
Figure 3:
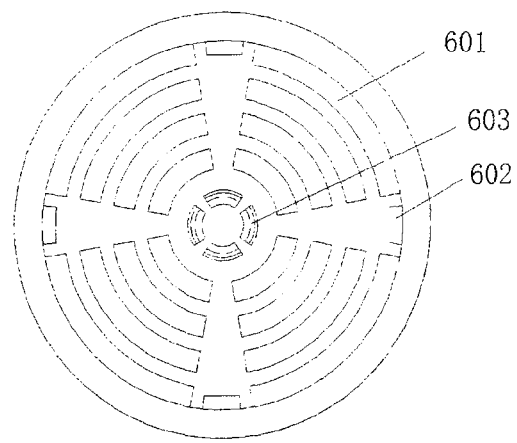
FIG. 3 is a structural view of the insulating spacer in FIG. 1.

As shown in FIGS. 1, 2 and 3, a battery comprises a cover board 1, a stretchable conductor 2, a staple 3, an elastic pressing disc 4, an elastic conductive ring 5, an insulating spacer 6, a cell 8 and a shell 9. Tabs 7 protrude from an end of the cell 8. The tabs comprise a positive tab and a negative tab located at two ends of the cell 8 respectively.

The cell 8 is formed in a cylinder shape and installed in the shell 9 having a round shape.

A periphery wall of the insulating spacer 6 has a shape matching with an inner chamber of the shell 9. A bottom surface of the insulating spacer 6 is arranged on an end surface of the cell 8. Orifices 601 are arranged in the insulating spacer 6 so that the tabs 7 of the cell can pass through the insulating spacer 6 from the bottom surface to the other surface.

Figure 4:
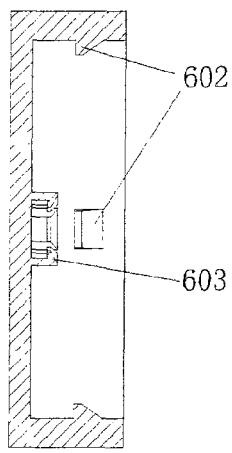
FIG. 4 is a left view of FIG. 3.
Figure 5:
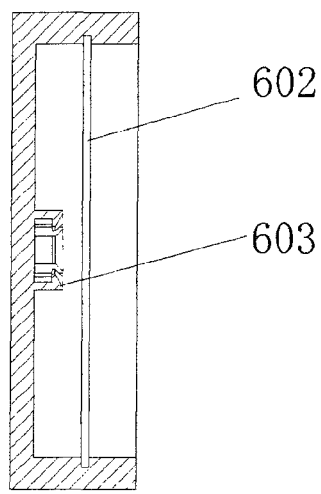
FIG. 5 is a structural view of the another insulating spacer.

The elastic conductive ring 5 is stacked on the insulating spacer 6, and the elastic pressing disc 4 is stacked on the elastic conductive ring 5. Installation steps 602 are arranged on an inner wall of a periphery of the insulating spacer 6, in which peripheries of the elastic conductive ring 5 and the elastic pressing disc 4 are clamped so that a rapid assembly of the tabs is achieved and a reliable contact of conductors is ensured. As shown in FIG. 4, the installation steps 602 may be a plurality of installation clips distributed on the inner wall of the insulating spacer 6. Alternatively, as shown in FIG. 5, the installation steps 602 may be an annular installation groove arranged on the inner wall of the insulating spacer 6.

Figure 6:
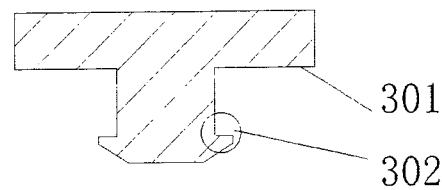
FIG. 6 is a structural view of the staple in FIG. 1.

As shown in FIG. 6, a pressure surface 301 is provided on one end of the staple 3 for pressing the elastic pressing disc 4 on the elastic conductive ring 5. A slot 302 is provided on the other end of the staple 3. An elastic hook 603 (in FIG. 3) is arranged on the insulating spacer 6 at a position corresponding to the slot 302. The slot 302 matches with the elastic hook 603 and cooperates with the pressure surface 301 to press the elastic pressing disc 4 on the elastic conductive ring 5 for resisting a deformation of the elastic conductive pressing disc and enhancing the connection. On one hand, the elastic conductive ring 5 may press the tabs 4 tightly for an adequately contact. On the other hand, the elastic conductive ring 5 may conductively connect the tabs 7 and the elastic pressing disc 4. The elastic pressing disc 4 is clamped by the installation steps 602 on the inner wall of the insulating spacer 6 for fixing the elastic conductive ring 5 filled therebetween and applying a prepressing on the elastic conductive ring 5.

Figure 7:
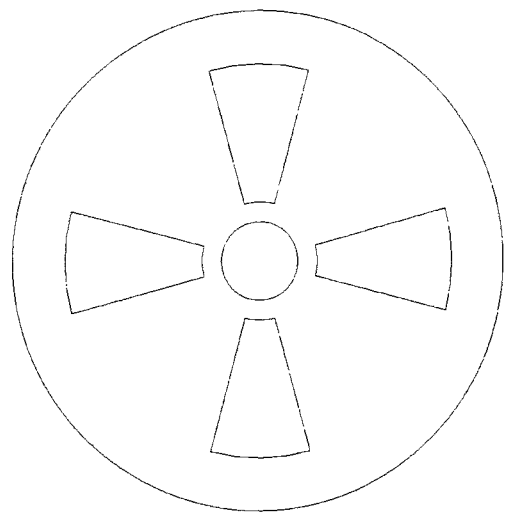
FIG. 7 is a structural view of the elastic pressing disc in FIG. 1.

The structure of the elastic pressing disc 4 is shown in FIG. 7. The staple 3 passes through a center hole of the elastic pressing disc.

Figure 8:
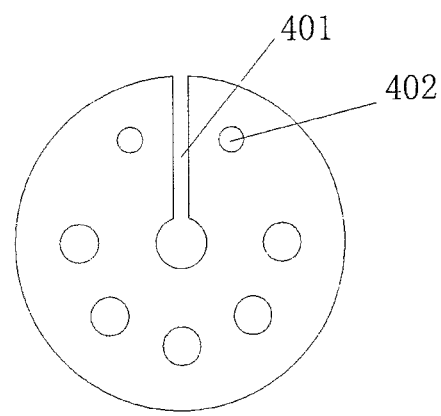
FIG. 8 is a structural view of another elastic pressing disc.

The structure of another elastic pressing disc 4 is shown in FIG. 8. As shown, a gap 401 communicating with the center hole is provided. Assembly holes 402 are arranged on both sides of the gap. When the staple 3 is needed to be clamped into the center hole, a tool may be inserted into the assembly holes 402 to pull the gap 401 out so that the center hole is expanded and thus the staple may be easily clamped into the center hole.

The stretchable conductor 2 is connected between the staple 3 and the positive, negative poles on the cover board 1, or between the elastic pressing disc 4 and the positive, negative poles on the cover board 1 so that the tabs 7 are electrically connected with the cover board 1.

The assembly process of the above-mentioned battery is as below:

1) The insulating spacer 6 is installed. The insulating spacer 6 is positioned at an end of the cell 8 so that the tabs 7 pass through the orifices 601 of the insulating spacer 6.

2) The tabs 7 are pressed and the elastic conductive ring 5 is filled. The portion of the tabs 7 protruded above the insulating spacer 6 is pressed to be bent, and then the elastic conductive ring 5 is placed on the tabs to be electrically connected with the tabs 7.

3) The elastic pressing disc 4 is clamped in. The elastic pressing disc 4 is pressed into the insulating spacer 6 and clamped into a lower portion of the installation steps 602 so as to be electrically connected with the elastic conductive ring 5.

4) The staple 3 are inserted. The slot 302 at the lower end of the staple 3 is matched with the elastic hook 603 with the pressure surface 301 at the upper portion pressing the elastic pressing disc 4 tightly. The stretch conductor 2 is then used for connecting the cover board 1 and the staple 3 or connecting the cover board 1 and the elastic pressing disc 4, so that the electrical connection between the tabs 7 and the cover board 1 is achieved.

5) The battery shell 9 is sealed with the cover board 1 fixedly.

The above connections among the staple 3, elastic pressing disc 4, elastic conductive ring 5, insulating spacer 6 and tabs 7 are contact connections. Various components contact with each other tightly by contact pressure therebetween. Thus, the welding is unnecessary in the battery.

Hereinabove, the present invention is described in detail with reference to non-limited particular embodiments. It will be understood by those skilled in the art that numerous simple deductions or substitutions may be carried out without exceeding the conception of the invention, all of which are to be considered within the protective scope of the present invention.

What is claimed is:

1. A connector for connecting a plurality of tabs of a cell with a cover board, the connector comprising:
   an insulating spacer having a plurality of orifices;
   an elastic conductive ring positioned on the insulating spacer;
   an elastic pressing disc positioned onto the elastic conductive ring and configured to press the elastic conductive ring;
   a staple configured to be arranged between the elastic pressing disc and the cover board, the staple having a first end having a pressing surface configured to press the elastic pressing disc on the elastic conductive ring and a second end having a slot matching with an elastic hook at the insulating spacer; and
   a stretchable conductor configured to connect the cover board and the staple,
   wherein the orifices of the insulating spacer are configured to have the tabs passing therethrough, and the elastic conductive ring is configured to be electrically connected with the tabs passing through the orifices, and
   wherein the elastic pressing disc is configured to be electrically connected with the cover board via the elastic pressing disc, the staple, and the stretchable conductor.

2. The connector of claim 1, wherein the elastic conductive ring is configured to be electrically connected with the cover board.

3. The connector of claim 1, wherein said insulating spacer comprises installation steps, and peripheries of the elastic conductive ring and the elastic pressing disc are clamped within the installation steps fixedly.

4. The connector of claim 3, wherein the installation steps comprise a plurality of installation clips or an annular installation groove arranged at an inner wall of the insulating spacer.

5. A battery, comprising:
   a cell having one or more tabs;
   an insulating spacer having a plurality of orifices, and being positioned on the cell;
   an elastic conductive ring positioned at the insulating spacer;

a cover board electrically positioned above the elastic conductive ring;

an elastic pressing disc positioned onto the elastic conductive ring and configured to press the elastic conductive ring;

a staple arranged between the elastic pressing disc and the cover board, the staple having a first end having a pressing surface configured to press the elastic pressing disc on the elastic conductive ring and a second end having a slot matching with an elastic hook provide at the insulating spacer; and a stretchable conductor connecting the cover board and the staple, wherein the tabs pass through the orifices to be electrically connected with the elastic conductive ring, and wherein the elastic pressing disc is electrically connected with the cover board via the elastic pressing disc, the staple, and the stretchable conductor.

6. The battery of claim 5, wherein the elastic conductive ring and the cover board are electrically connected by contacting with each other.

7. The battery of claim 5, wherein the insulating spacer comprises installation steps, and peripheries of the elastic conductive ring and the elastic pressing disc are clamped within the installation steps fixedly.

8. The battery of claim 7, wherein the installation steps comprise a plurality of installation clips or an annular installation groove arranged on an inner wall of the insulating spacer.

9. The connector of claim 1, wherein the elastic pressing disc is configured to be electrically connected with the cover board via the elastic pressing disc, the staple, and the stretchable conductor without welding.

10. The battery of claim 5, wherein the elastic pressing disc is electrically connected with the cover board via the elastic pressing disc, the staple, and the stretchable conductor without welding.

* * * * *